United States Patent
Kang et al.

(10) Patent No.: US 12,095,399 B2
(45) Date of Patent: Sep. 17, 2024

(54) SENSORLESS INDUCTION MOTOR SYSTEM AND CONTROL METHOD THEREOF

(71) Applicants: Hyundai Motor Company, Seoul (KR); Kia Corporation, Seoul (KR)

(72) Inventors: Min Su Kang, Paju-si (KR); Joo Yeon Kim, Seoul (KR); Sung Do Kim, Seoul (KR); Chang Seok You, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 217 days.

(21) Appl. No.: 17/972,726

(22) Filed: Oct. 25, 2022

(65) Prior Publication Data

US 2023/0387834 A1    Nov. 30, 2023

(30) Foreign Application Priority Data

May 27, 2022    (KR) .................. 10-2022-0065215

(51) Int. Cl.
    *H02K 7/10*    (2006.01)
    *H02P 3/18*    (2006.01)
    *H02P 23/14*   (2006.01)

(52) U.S. Cl.
    CPC ............... *H02P 3/18* (2013.01); *H02P 23/14* (2013.01)

(58) Field of Classification Search
    CPC .. H02P 3/18; H02P 23/14; H02P 21/18; H02P 6/185; H02P 6/24; H02P 27/06
    See application file for complete search history.

(56) References Cited

FOREIGN PATENT DOCUMENTS

| JP | 2013081372 A | * | 5/2013 | ........... F04D 27/004 |
| KR | 10-2021-0137757 A | | 11/2021 | |
| KR | 10-2023-0153085 A | | 11/2023 | |

OTHER PUBLICATIONS

Shin Nakashima, et al. (2000). Sensor-less Initial Rotor Position Estimation of Surface Permanent-Magnet Synchronous Motor. IEEE Transactions on Industry Applications. 36(6):1598-1603.

\* cited by examiner

*Primary Examiner* — Karen Masih
(74) *Attorney, Agent, or Firm* — Morgan, Lewis & Bockius LLP (57) ABSTRACT

A sensorless induction motor system and a control method thereof includes a motor including a stator including windings forming a plurality of phases and a rotor including a permanent magnet, and a controller configured to control operation of the motor by controlling a voltage applied to each phase of the stator, to set a stop waiting time predicted to be necessary for the rotor to stop when the motor is controlled to stop, to apply a pulse voltage to each phase of the stator a plurality of times after the stop waiting time, and to conclude that the rotor has stopped when a minimum deviation value of an induced current is equal to or greater than a reference value.

18 Claims, 9 Drawing Sheets

| Pulse voltage applied vector angle | | V1 (0 degrees) | V4 (180 degrees) | V2 (60 degrees) | V5 (240 degrees) | V3 (120 degrees) | V6 (300 degrees) |
|---|---|---|---|---|---|---|---|
| U phase | Initial (first) | IniCurl U 0 | IniCurl U 180 | IniCurl U 60 | IniCurl U 240 | IniCurl U 120 | IniCurl U 300 |
| | Last (n-th) | FnlCurl U 0 | FnlCurl U 180 | FnlCurl U 60 | FnlCurl U 240 | FnlCurl U 120 | FnlCurl U 300 |
| V phase | Initial (first) | IniCurl V 0 | IniCurl V 180 | IniCurl V 60 | IniCurl V 240 | IniCurl V 120 | IniCurl V 300 |
| | Last (n-th) | FnlCurl V 0 | FnlCurl V 180 | FnlCurl V 60 | FnlCurl V 240 | FnlCurl V 120 | FnlCurl V 300 |
| W phase | Initial (first) | IniCurl W 0 | IniCurl W 180 | IniCurl W 60 | IniCurl W 240 | IniCurl W 120 | IniCurl W 300 |
| | Last (n-th) | FnlCurl W 0 | FnlCurl W 180 | FnlCurl W 60 | FnlCurl W 240 | FnlCurl W 120 | FnlCurl W 300 |

FIG. 7

| Pulse voltage applied vector angle | V1 (0 degrees) | V4 (180 degrees) | V2 (60 degrees) | V5 (240 degrees) | V3 (120 degrees) | V6 (300 degrees) |
|---|---|---|---|---|---|---|
| U phase | △I_U1 | △I_U4 | △I_U2 | △I_U5 | △I_U3 | △I_U6 |
| V phase | △I_V1 | △I_V4 | △I_V2 | △I_V5 | △I_V3 | △I_V6 |
| W phase | △I_W1 | △I_W4 | △I_W2 | △I_W5 | △I_W3 | △I_W6 |

SENSORLESS INDUCTION MOTOR SYSTEM AND CONTROL METHOD THEREOF

CROSS-REFERENCE TO RELATED APPLICATION

The present application claims priority to Korean Patent Application No. 10-2022-0065215, filed on May 27, 2022, the entire contents of which is incorporated herein for all purposes by this reference.

BACKGROUND OF THE PRESENT DISCLOSURE

Field of the Present Disclosure

The present disclosure relates to a sensorless induction motor system and a control method thereof which can prevent response delay of a sensorless induction motor and prevent occurrence of overcurrent and control failure due to incorrect position estimation by accurately identifying a stop completion time and a stop position of a rotor without a sensor, and in particular, can accurately determine whether to stop the rotor at once without repeatedly applying a pulse voltage multiple times, reducing inverter loss and improving durability.

Description of Related Art

Induction motors are used in various fields, and in particular, are used in air compressors of fuel cell vehicles. To reduce a package size and weight of an air supply system, an air compressor applied to fuel cell systems takes an integrated form in which an inverter and a motor are integrated.

In such an integrated air compressor, a sensorless control method, which is a method of estimating the position of a rotor without a Hall sensor, may be applied. However, because the sensorless control method has poor estimation performance at a low speed, speed control may not be performed below a certain speed.

Furthermore, a stop time of the air compressor largely varies according to mechanical design deviation, a degree of aging of the air compressor/friction caused by heat due to rotation, and characteristics of the inertia. Therefore, if the stop time of the air compressor is set to be short, incorrect vector values may cause incorrect identification of the position of the rotor and sensorless control failure. Furthermore, an excessively long stop time may cause acceleration delay when the air compressor is restarted.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a sensorless induction motor system and a control method thereof which can prevent response delay of a sensorless induction motor and prevent occurrence of overcurrent and control failure due to incorrect position estimation by accurately identifying a stop completion time and a stop position of a rotor without a sensor, and can accurately determine whether to stop the rotor at once without repeatedly applying a pulse voltage multiple times, reducing inverter loss and improving durability.

In accordance with various aspects of the present disclosure, the above and other objects may be accomplished by the provision of a sensorless induction motor system including a motor including a stator including windings forming a plurality of phases and a rotor including a permanent magnet, and a controller configured to control operation of the motor by controlling a voltage applied to each phase of the stator, to set a stop waiting time predicted to be necessary for the rotor to stop when the motor is controlled to stop, to apply a pulse voltage to each phase of the stator a plurality of times after the stop waiting time, and to conclude that the rotor has stopped when a minimum deviation value of an induced current is equal to or greater than a reference value.

The controller may set the stop waiting time when a rotation speed of the rotor is reduced to a reference speed during stop control of the motor.

The controller may be configured to determine an instantaneous deceleration gradient at a point in time when the rotation speed of the rotor is reduced to the reference speed, and set the stop waiting time according to the determined instantaneous deceleration gradient.

The stop waiting time may be a time taken from when the rotation speed of the rotor is reduced to the reference speed to when the rotor is predicted to stop according to the instantaneous deceleration gradient.

The motor may be a three-phase induction motor, and the controller may be configured to determine an initial value and a final value of an induced current flowing through each phase for each vector to which the pulse voltage is applied.

The controller may be configured to determine the initial value and the final value of the induced current flowing through each phase and determine a deviation of the induced current from a difference between the initial value and the final value.

The motor may be a three-phase induction motor, and the controller may be configured to determine a total of 36 induced current values by determining initial values and final values of induced currents flowing through the respective phases for every 6 vectors to which the pulse voltage is applied.

The controller may be configured to determine the initial value and the final value of the induced current flowing through each phase, and determine a deviation of the induced current from a difference between the initial value and the final value to determine a total of 18 induced current deviation values.

The controller may be configured to determine a minimum deviation value among the 18 induced current deviation values, and determine that the rotor has stopped when the minimum deviation value is equal to or greater than the reference value.

The controller may estimate a position of the rotor in a stationary state through a pulse voltage vector corresponding to a maximum deviation value of the induced current upon determining that the rotor has stopped.

In accordance with another aspect of the present disclosure, there is provided a method of controlling a sensorless induction motor system including a motor including a stator including windings forming a plurality of phases and a rotor including a permanent magnet, and a controller configured for controlling operation of the motor by controlling a voltage applied to each phase of the stator, the method, performed by the controller, including starting stop control of the motor, setting a stop waiting time predicted to be necessary for the rotor to stop, applying a pulse voltage to each phase of the stator a plurality of times after the stop waiting time, deriving a minimum deviation value of induced current according to application of the pulse voltage, and determining whether the determined minimum deviation value is equal to or greater than a reference value and determining that the rotor has stopped when the minimum deviation value is equal to or greater than the reference value.

The driving of the minimum deviation value may include determining an initial value and a final value of induced current flowing through each phase for each vector to which the pulse voltage is applied.

The deriving of the minimum deviation value may include deriving a deviation of induced current through a difference between the initial value and the final value of the induced current flowing through each phase.

The determining that the rotor has stopped may include deriving a minimum deviation value among induced current deviation values and determining that the rotor has stopped when the minimum deviation value is equal to or greater than the reference value.

The method may further include estimating a position of the rotor in a stationary state through a pulse voltage vector corresponding to a maximum deviation value of the induced current after the determining that the rotor has stopped.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to a same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Figure 1:
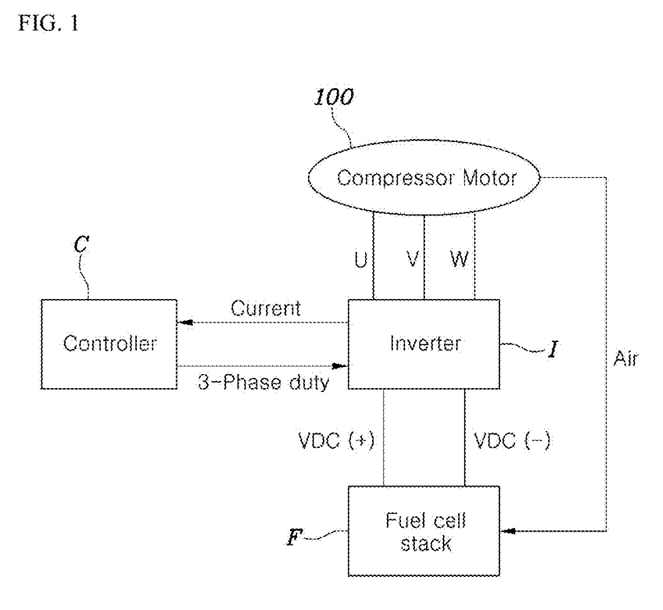
FIG. 1 and FIG. 2 are block diagrams of a sensorless induction motor system according to various exemplary embodiments of the present disclosure.
Figure 2:
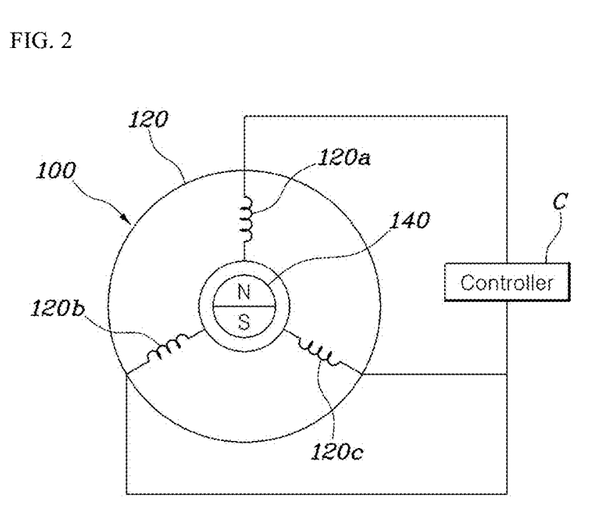
Figure 3:
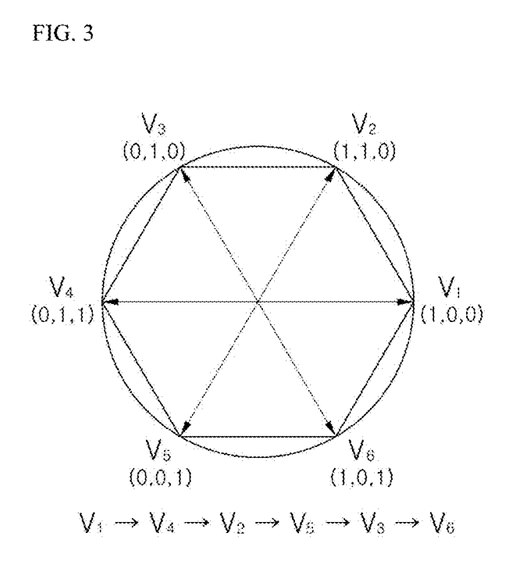
FIG. 3, FIG. 4, and FIG. 5 are diagrams for describing the sensorless induction motor system and a control method thereof according to various exemplary embodiments of the present disclosure.
Figure 4:
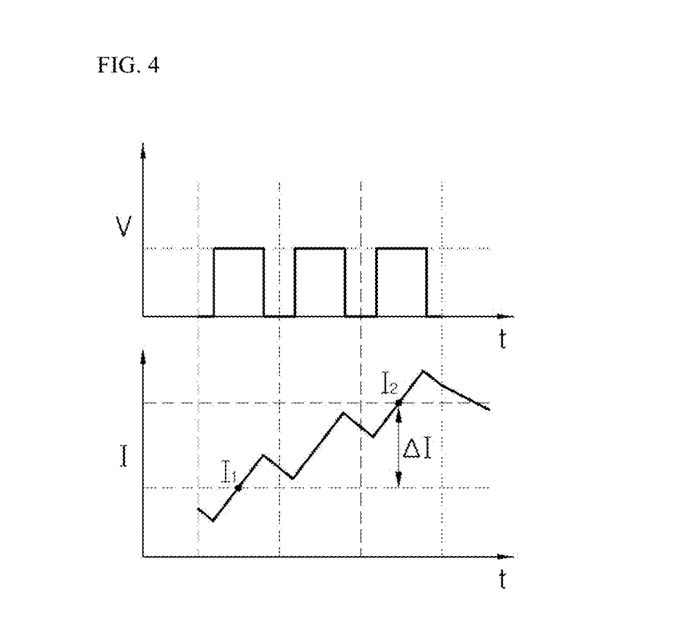
Figure 5:
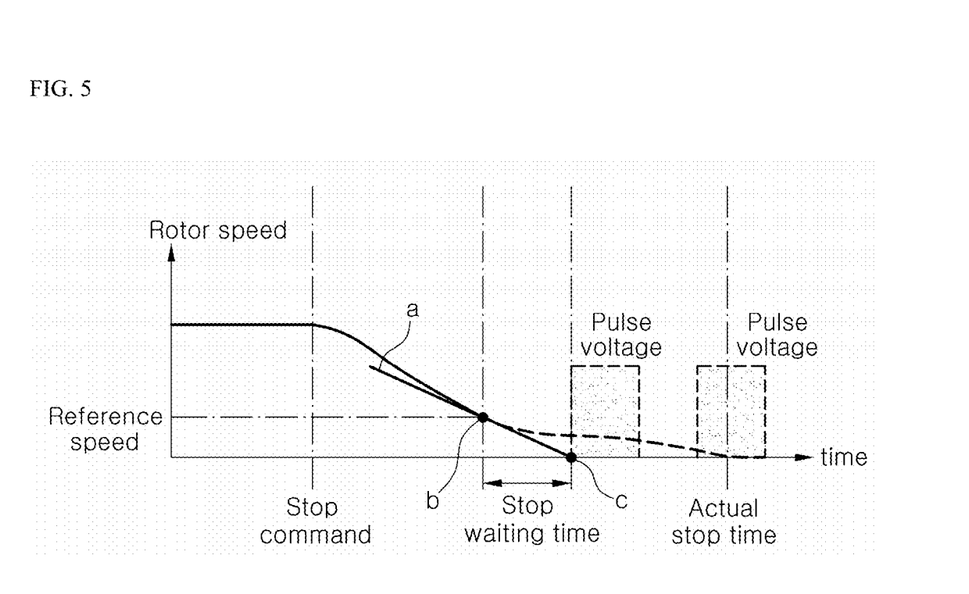
Figure 6:
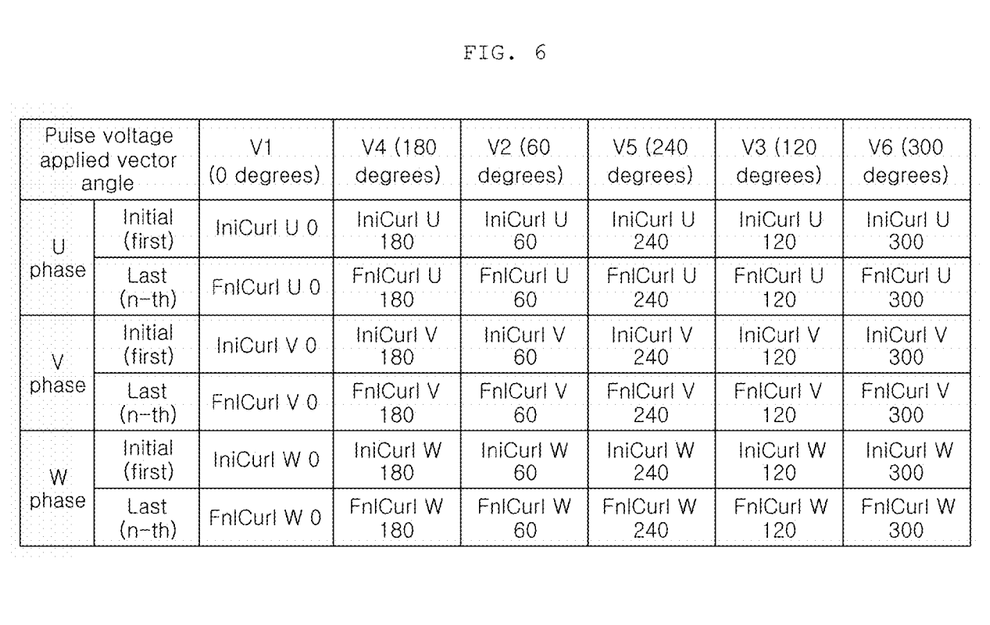
FIG. 6 and FIG. 7 are tables showing examples of induced current deviations in the sensorless induction motor system and the control method thereof according to various exemplary embodiments of the present disclosure.
Figure 7:
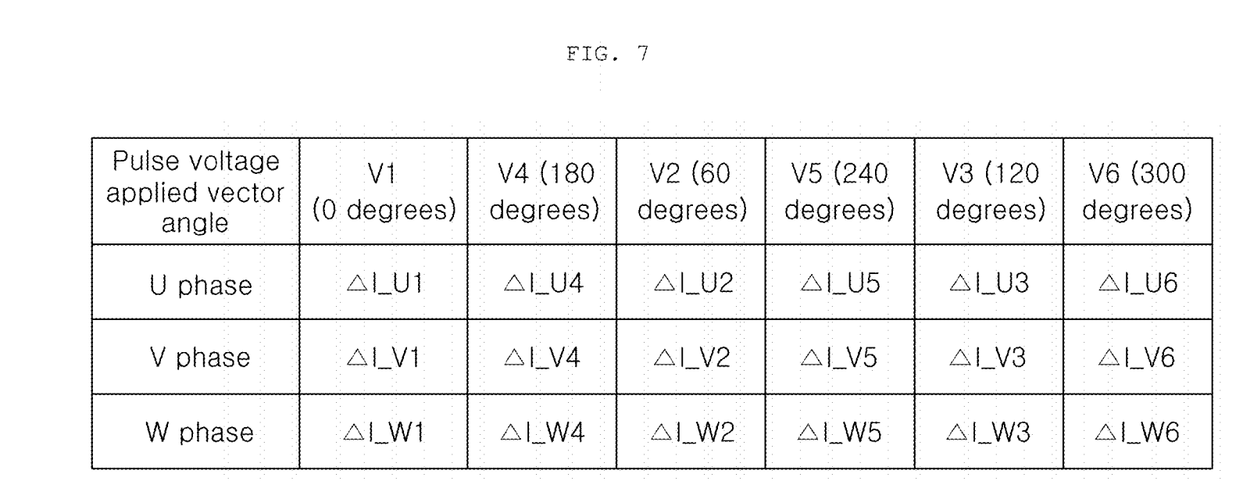
Figure 8:
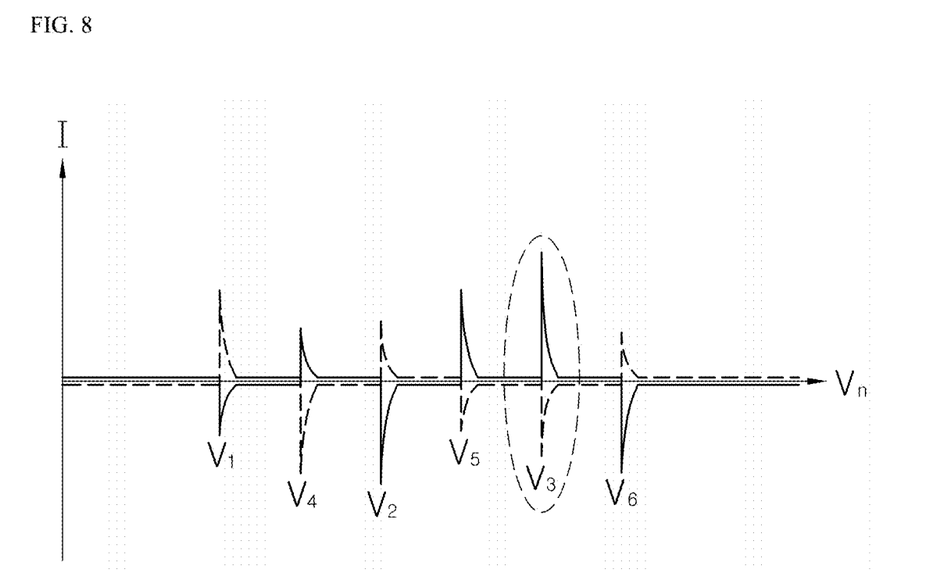
FIG. 8 is a graph showing rotor stop positions according to the sensorless induction motor system and the control method thereof according to various exemplary embodiments of the present disclosure.
Figure 9:
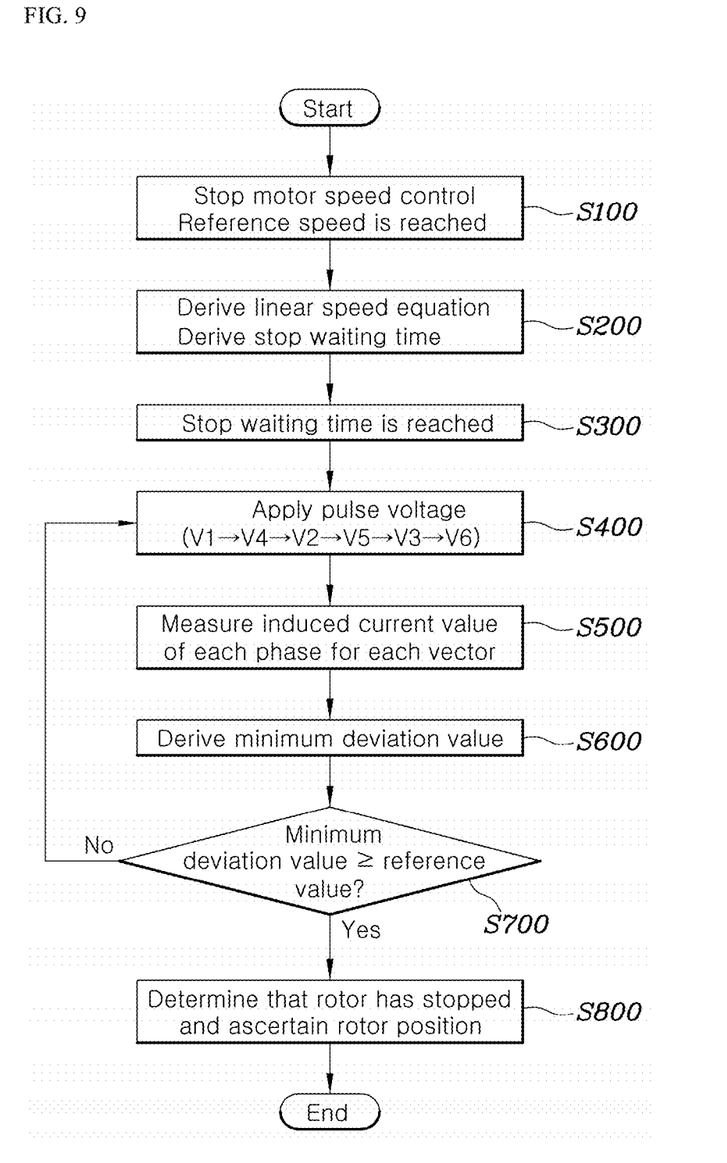
FIG. 9 is a flowchart illustrating a method of controlling the sensorless induction motor system according to various exemplary embodiments of the present disclosure.

FIG. 1 and FIG. 2 are block diagrams of a sensorless induction motor system according to various exemplary embodiments of the present disclosure, FIG. 3, FIG. 4, and FIG. 5 are diagrams for describing the sensorless induction motor system and a control method thereof according to various exemplary embodiments of the present disclosure, FIG. 6 and FIG. 7 are tables showing examples of induced current deviations in the sensorless induction motor system and the control method thereof according to various exemplary embodiments of the present disclosure, FIG. 8 is a graph showing rotor stop positions according to the sensorless induction motor system and the control method thereof according to various exemplary embodiments of the present disclosure, and FIG. 9 is a flowchart illustrating a method of controlling the sensorless induction motor system according to various exemplary embodiments of the present disclosure.

FIG. 1 and FIG. 2 are block diagrams of a sensorless induction motor system according to various exemplary embodiments of the present disclosure. The sensorless induction motor system according to an exemplary embodiment of the present disclosure includes a motor 100 provided with a stator including windings forming a plurality of phases 120*a*, 120*b*, and 120*c*, and a rotor 140 including a permanent magnet; and a controller C configured to control the operation of the motor by controlling a voltage applied to each phase of the stator, to set a stop waiting time expected to be required for the rotor to stop during stop control of the motor, to apply a pulse voltage to each phase of the station multiple times after the stop waiting time, and to determine that the rotor stops when a minimum deviation value with a smallest deviation of induced current is equal to or greater than a reference value.

The induction motor of the present disclosure may be used in various fields, and a typical example is an air compressor of a fuel cell system. Therefore, an induction motor applied to an air compressor will be described below as an exemplary embodiment of the present disclosure, and a permanent magnet surface-mounted three-phase induction motor may be exemplified as the motor of the present disclosure in an exemplary embodiment of the present disclosure.

Furthermore, a controller according to various exemplary embodiments of the present disclosure may be implemented by a nonvolatile memory that stores an algorithm configured to control operations of various components of a vehicle or data related to software commands for executing the algorithm, and a processor configured to perform operations which will be described below using data stored in the memory. Here, the memory and the processor may be implemented as separate chips. Alternatively, the memory and the processor may be implemented as a single integrated chip. The processor may take the form of one or more processors.

As shown in FIG. 1, the sensorless induction motor system of the present disclosure may include an inverter that applies a three-phase voltage to the motor, a controller that receives a three-phase induced current of the inverter and transmits a three-phase duty ratio as a control signal to the inverter, and a fuel cell that provides driving power of the motor to the inverter. As shown in FIG. 2, the induction motor 100 includes a stator 120 and a rotor 140, the stator is provided with windings forming a plurality of phases, and the rotor is provided with a permanent magnet. As an exemplary embodiment of the present disclosure, the stator may include U-phase 120a, V-phase 120b, and W-phase 120c, and each phase is provided with a winding. The permanent magnet of the rotor 140 has an N pole and an S pole.

The controller C can drive or stop the rotor of electric motor and control the rotation speed by controlling a voltage applied to each phase with a duty ratio.

Although sensors including a resolver, an encoder, a Hall sensor, and the like are used in a motor to ascertain the speed of the rotor and to accurately detect the position of the rotor, in general, various embodiments of the present disclosure relates to an induction motor that ascertains the position and speed of the rotor thereof without a sensor. Furthermore, in the case of the sensorless induction motor of the present disclosure, the principle of estimating a rotor position based on the back electromotive force may be applied in an exemplary embodiment of the present disclosure.

However, because the sensorless estimation method based on back electromotive force has poor estimation performance at a low speed, speed control is not performed below a certain speed, and a stationary position is estimated through voltage injection after waiting for a certain stop time. However, the stop time of the air compressor largely varies according to mechanical design deviations, a degree of aging of the air compressor/friction caused by rotational heat, and characteristics of the inertia. Therefore, there is a demand for a method of reducing such deviations.

To the present end, the controller of the present disclosure sets a stop waiting time predicted to be necessary for the rotor to stop during stop control of the motor. When the stop waiting time is reached, the controller is configured to apply a pulse voltage to each phase of the stator multiple times, and if a minimum deviation value with a smallest deviation of the induced current is equal to or greater than a reference value, determines that the rotor stops.

If the motor is rotating at a low speed, a deviation value of the induced current is not constant because the rotor has not stopped and is continuously changed until the rotor finally stops. Therefore, when the motor completely stops, a deviation between a first measured current value and a last measured current value is not irregular and has a certain value or more.

That is, it is possible to determine that the motor is still rotating if a deviation between the first and last measured current values is a very small value less than a certain level and determine that the motor has stopped if a minimum deviation value is greater than a certain level.

Accordingly, it is possible to more accurately identify an unstable position and to correctly determine stoppage of the motor at a low speed, and accordingly, it is possible to prevent response delay of the sensorless induction motor by accurately identifying a stop completion time and a stop position of the rotor without a sensor and to prevent occurrence of overcurrent and control failure due to incorrect position estimation.

When the motor has not completely stopped, if it is erroneously determined that the motor has stopped and the motor is restarted, overcurrent and control failure may occur, which may lead to failure of the motor. Furthermore, if it is erroneously determined that the motor has not stopped yet although the motor has stopped, response delay of the motor occurs during restarting.

The present disclosure can ascertain a complete stop time of the motor relatively accurately and thus can solve problems caused by incorrect ascertainment of stop time.

It is possible to prevent reduction in fuel efficiency and durability due to inverter switching loss by decreasing the number of times of applying a pulse voltage for determining motor stop as much as possible and to improve the reliability of rotor stop determination by reducing the possibility of wrong determination of stoppage of the rotor.

FIG. 3, FIG. 4, and FIG. 5 are diagrams for describing a sensorless induction motor system and a control method thereof according to various exemplary embodiments of the present disclosure.

FIG. 3 shows voltage vectors for describing a sequence of applying a pulse voltage. Voltage vectors in a three-phase induction motor may be represented by $V_1$, $V_2$, $V_3$, $V_4$, $V_5$, and $V_6$ in a counterclockwise direction as shown. Each vector represents a direction in which the N pole of the rotor faces, and the voltage vectors may be assumed as six position vectors at intervals of 60 degrees.

In order not to affect a stationary air compressor rotor, a voltage is applied in a rotation direction in which the rotor stops and a direction in which magnetic fields generated due to application of the pulse voltage are canceled. Accordingly, in the illustrated example, the voltage may be applied in the order of $V_1$, $V_4$, $V_2$, $V_5$, $V_3$, and $V_6$.

As a result of application of the pulse voltage as described above, an induced current as shown in FIG. 4 may be generated. FIG. 4 shows an induced current generated when the pulse voltage is applied in the order of $V_1$, $V_4$, $V_2$, $V_5$, $V_3$, and $V_6$. The position where a difference between a minimum value and a maximum value of the induced current is largest is $V_3$, which shows that the N pole of the rotor is located at the position of 120 degrees. That is, when the controller applies the pulse voltage to each phase of the stator after the stop waiting time, the controller is configured to apply the pulse voltage in a crossing manner so that magnetic fields are canceled. As a result, it is possible to ascertain the position of a phase including the largest deviation of the induced current as the stop position of the rotor as well as ascertaining the stop time of the rotor.

First, to ascertain the stop time of the rotor, it is necessary to apply the pulse voltage to each phase of the stator at certain intervals and compare deviations of the induced current. Because it is necessary to detect a minimum deviation value of the induced current, sampling for emphasizing variation in the current is selected and current increments are compared. However, because a current deviation between phases is unclear if the magnitude of the induced current is small whereas the stopped motor may rotate in the reverse direction if the magnitude of the induced current is large, a certain voltage level and a limit of a sampling count need to be selected through experiments.

FIG. 4 is a graph showing the above-described process. When the pulse voltage is applied, an induced current according thereto is observed as shown in FIG. 4. A deviation $\Delta I$ between a minimum value I1 and a maximum value I2 is derived from the observed induced current. If a smallest value of $\Delta I$ among a plurality of values of $\Delta I$ derived for each phase is equal to or greater than a reference value, it is determined that the rotor is finally stopped. Furthermore, a vector position corresponding to a largest value of $\Delta I$ may be estimated as the position of the N pole in the state in which the rotor is stopped, that is, the position of the rotor.

When the motor of the air compressor is stopped, the rotor may be considered to be completely stopped if the smallest deviation value among the induced current deviation values of each phase is equal to or greater than the reference value, and in the instant state, the position corresponding to the largest deviation value is estimated as the position of the N pole of the rotor. When the motor of the air compressor is operating to stop at a low speed, the position of the rotor is not determined and thus the induced current deviation value is not constant and will continue to change until the rotor is stopped. If the motor has stopped, the deviation may be regarded as constant, and accordingly, it is possible to accurately ascertain the stop time and position of the rotor.

Hereinafter, a specific process for accurately determining stoppage of the rotor according to the present principle will be described.

First, the controller may set a stop waiting time when the rotation speed of the rotor is reduced to a reference speed during stop control of the motor. Because the accuracy of the sensorless method is guaranteed up to the reference speed, prediction is performed from the point in time when the rotation speed of the rotor is reduced to the reference speed.

FIG. 5 shows a process of determining stoppage of the rotor. When a stop command for the motor is issued, the controller not performs speed control of the motor. From then on, the speed of the rotor starts to decrease. Because the position and speed of the rotor may be determined up to the reference speed, prediction is started when the speed of the rotor reaches the reference speed.

For accurate prediction, the instantaneous gradient (a) of the speed at the point in time (b) at which the rotation speed of the rotor reaches the reference speed is determined. That is, the controller may be configured to determine the instantaneous deceleration gradient (a) at the point in time (b) at which the rotation speed of the rotor is reduced to the reference speed, obtain the x-axis intercept according to the determined instantaneous deceleration gradient (a), and set a stop waiting time through this.

The stop waiting time may be a time taken from when the rotation speed of the rotor is reduced to the reference speed to when the rotor stops according to the instantaneous deceleration gradient (a), as shown, which is a time at which the rotor is predicted to stop and is derived as a result of a linear function. However, there is a high probability that the actual rotor stop time is different from a predicted stop waiting time due to various environmental factors.

Therefore, to ascertain an accurate stop time, the controller is configured to determine whether the rotor stops using the minimum deviation value of the induced current.

The controller is configured to apply the pulse voltage to each phase of the stator multiple times after the stop waiting time, and when the minimum deviation value of the induced current is equal to or greater than the reference value, determines that the rotor has stopped. If the rotor has not completely stopped as shown in the graph of FIG. 5, it is considered that the minimum deviation value is equal to or less than the reference value when the pulse voltage is applied first. In the instant case, the pulse voltage is applied again, and if the minimum deviation value is equal to or greater than the reference value, it is determined that the rotor has stopped.

FIG. 6 and FIG. 7 are tables showing examples of induced current deviations in the sensorless induction motor system and the control method thereof according to various exemplary embodiments of the present disclosure.

If the pulse voltage application method is used from the process of stopping compressor speed control using the reference speed, unnecessary current may be applied, causing power loss even though the air compressor has not stopped. To solve the present problem, an efficient pulse voltage application strategy is required.

The rotor stop waiting time derived from the gradient when the air compressor motor has stopped is determined as an initial pulse voltage control time. from the present time, the pulse voltage is applied in the order of voltage application vector angles, and first and last current values of each phase are measured. For example, when the pulse voltage of the 3-phase motor is applied to 6 vector angles, as shown in the table of FIG. 6, a total of 36 induced current measurement values is obtained.

For reference, theoretically, even if the applied pulse voltage is constant, the amount of charge maintained by the inductance component of the motor stator coil increases and the measured current gradually increases, and thus a finally measured current value is greater than an initially measured current value. Accordingly, it may be necessary to control a waiting time to stop switching for a certain time period to be provided until charges in the motor coil are completely removed at the time of transition from the current vector angle to the next vector angle.

FIG. 6 is a table showing initial values and final values of induced currents measured in U, V, and W phases for each voltage vector position, and accordingly, a total of 36 currents is measured.

Furthermore, FIG. 7 is a table showing results of derivation of a deviation value between an initial value and a final value for each phase, and accordingly, a total of 18 current deviation values is derived.

When the motor has completely stopped, a deviation between the first measured current value and the last measured current value is a certain value or more and clearly appear. That is, if a deviation between the first and last measured current values is measured as a value less than a certain level, it may be determined that the motor is still rotating.

In conclusion, the controller is configured to determine that the rotor has stopped when the minimum deviation value among the 18 deviation values of the induced current is equal to or greater than a reference value.

Upon determining that the rotor has stopped, the controller may estimate the position of the rotor that has stopped through the pulse voltage vector corresponding to the maximum deviation value of the induced current.

FIG. 9 is a flowchart for describing a method of controlling a sensorless induction motor system according to various exemplary embodiments of the present disclosure. The method of controlling a sensorless induction motor system, which includes a motor including a stator including windings forming a plurality of phases and a rotor including a permanent magnet, and a controller configured for controlling operation of the motor by controlling a voltage applied to each phase of the stator, is performed by the controller and includes: starting stop control of the motor; setting a stop waiting time predicted to be required for the rotor to stop; applying a pulse voltage to each phase of the stator a plurality of times after the stop waiting time; deriving a minimum deviation value of an induced current according to application of the pulse voltage; and determining whether the derived minimum deviation value is equal to or greater than a reference value and determining that the rotor has stopped when the minimum deviation value is equal to or greater than the reference value.

First, when the fuel cell system enters a stop mode, the controller is configured to receive a stop command for the air compressor and stops speed control of the motor of the air compressor. Accordingly, the rotor of the motor is gradually decelerated and the speed thereof is reduced to a reference speed (S100).

In step S200 of setting the stop waiting time when the speed of the rotor is reduced to the reference speed, the controller may be configured to determine an instantaneous deceleration gradient at a point in time when the rotation speed of the rotor is reduced to the reference speed and set the stop waiting time according to the determined instantaneous deceleration gradient.

When the stop waiting time has elapsed (S300), the controller is configured to apply a pulse voltage in a predetermined order (S400) and measures the induced current of each phase for each voltage vector (S500).

Accordingly, current deviation values that are differences between initial and final currents for the respective phases are derived, and a minimum deviation value among the derived current deviation values is derived (S500 and S600).

If the derived minimum deviation value is equal to or greater than a reference value, it is determined that the rotor has stopped, and the position of the rotor that has stopped may also be ascertained through a position vector corresponding to a maximum deviation value among the derived deviation values (S700 and S800).

If the derived minimum deviation value is less than the reference value, it is determined that the rotor has not yet stopped, and control of applying the pulse voltage, deriving a minimum deviation value again, and comparing the minimum deviation value with the reference value is repeated.

According to the sensorless induction motor system and the control method of the present disclosure, it is possible to prevent response delay of a sensorless induction motor and present occurrence of overcurrent and control failure due to incorrect position estimation by accurately identifying a stop completion time and a stop position of a rotor without a sensor, and to accurately determine whether to stop the rotor at once without repeatedly applying a pulse voltage multiple times, reducing inverter loss and improving durability.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A sensorless induction motor system comprising:
  a motor including a stator including windings forming a plurality of phases and a rotor including a permanent magnet; and
  a controller configured to control operation of the motor by controlling a voltage applied to each phase of the stator, to set a stop waiting time predicted to be necessary for the rotor to stop when the motor is controlled to stop, to apply a pulse voltage to each phase of the stator a plurality of times after the stop waiting time, and to conclude that the rotor has stopped when a minimum deviation value of an induced current is equal to or greater than a reference value.

2. The sensorless induction motor system of claim 1, wherein the controller is configured to set the stop waiting time when a rotation speed of the rotor is reduced to a reference speed during stop control of the motor.

3. The sensorless induction motor system of claim 2, wherein the controller is configured to determine an instantaneous deceleration gradient at a point in time when the rotation speed of the rotor is reduced to the reference speed, and sets the stop waiting time according to the determined instantaneous deceleration gradient.

4. The sensorless induction motor system of claim 3, wherein the stop waiting time is a time taken from when the rotation speed of the rotor is reduced to the reference speed to when the rotor is predicted to stop according to the instantaneous deceleration gradient.

5. The sensorless induction motor system of claim 1, wherein the motor is a three-phase induction motor, and the controller is configured to determine an initial value and a final value of an induced current flowing through each phase for each vector to which the pulse voltage is applied.

6. The sensorless induction motor system of claim 5, wherein the controller is configured to determine the initial value and the final value of the induced current flowing through each phase and to determine a deviation of the induced current from a difference between the initial value and the final value.

7. The sensorless induction motor system of claim 1, wherein the motor is a three-phase induction motor, and the controller is configured to determine a total of 36 induced current values by determining initial values and final values of induced currents flowing through the respective phases for every 6 vectors to which the pulse voltage is applied.

8. The sensorless induction motor system of claim 7, wherein the controller is configured to determine the initial value and the final value of the induced current flowing through each phase, and to determine a deviation of the induced current from a difference between the initial value and the final value to determine a total of 18 induced current deviation values.

9. The sensorless induction motor system of claim 8, wherein the controller is configured to determine a minimum deviation value among the 18 induced current deviation values, and to determine that the rotor has stopped when the minimum deviation value is equal to or greater than the reference value.

10. The sensorless induction motor system of claim 1, wherein the controller is configured to estimate a position of the rotor in a stationary state through a pulse voltage vector corresponding to a maximum deviation value of the induced current upon determining that the rotor has stopped.

11. A method of controlling a sensorless induction motor system including a motor including a stator including windings forming a plurality of phases and a rotor including a permanent magnet, and a controller configured for controlling operation of the motor by controlling a voltage applied to each phase of the stator, the method performed by the controller and comprising:
  starting stop control of the motor;
  setting a stop waiting time predicted to be necessary for the rotor to stop;
  applying a pulse voltage to each phase of the stator a plurality of times after the stop waiting time;
  deriving a minimum deviation value of induced current according to application of the pulse voltage; and
  determining whether the determined minimum deviation value is equal to or greater than a reference value and concluding that the rotor has stopped when the minimum deviation value is equal to or greater than the reference value.

12. The method of claim 11, wherein the driving of the minimum deviation value includes determining an initial value and a final value of induced current flowing through each phase for each vector to which the pulse voltage is applied.

13. The method of claim 12, wherein the deriving of the minimum deviation value includes deriving a deviation of induced current through a difference between the initial value and the final value of the induced current flowing through each phase.

14. The method of claim 13, wherein the determining that the rotor has stopped includes deriving a minimum deviation value among induced current deviation values and determining that the rotor has stopped when the minimum deviation value is equal to or greater than the reference value.

15. The method of claim 13, further including estimating a position of the rotor in a stationary state through a pulse voltage vector corresponding to a maximum deviation value of the induced current after the determining that the rotor has stopped.

16. The method of claim 11, wherein the controller is configured to set the stop waiting time when a rotation speed of the rotor is reduced to a reference speed during the stop control of the motor.

17. The method of claim 16, wherein the controller is configured to determine an instantaneous deceleration gradient at a point in time when the rotation speed of the rotor is reduced to the reference speed, and sets the stop waiting time according to the determined instantaneous deceleration gradient.

18. The method of claim 17, wherein the stop waiting time is a time taken from when the rotation speed of the rotor is reduced to the reference speed to when the rotor is predicted to stop according to the instantaneous deceleration gradient.

\* \* \* \* \*